(12) United States Patent
Holman

(10) Patent No.: US 10,291,103 B2
(45) Date of Patent: May 14, 2019

(54) BRUSHLESS DIRECT CURRENT MOTOR WITH INTEGRATED FAN

(71) Applicant: SFEG Corp., Fairview, TN (US)

(72) Inventor: Steven J. Holman, Franklin, TN (US)

(73) Assignee: SFEG Corp., Fairview, TN (US)

( * ) Notice: Subject to any disclaimer, the term of this patent is extended or adjusted under 35 U.S.C. 154(b) by 312 days.

(21) Appl. No.: 15/292,911

(22) Filed: Oct. 13, 2016

(65) Prior Publication Data

US 2018/0109164 A1   Apr. 19, 2018

(51) Int. Cl.
*H02K 9/06* (2006.01)
*H02K 21/14* (2006.01)
*H02K 15/03* (2006.01)
*H02K 15/16* (2006.01)

(52) U.S. Cl.
CPC ............... *H02K 9/06* (2013.01); *H02K 15/03* (2013.01); *H02K 15/165* (2013.01); *H02K 21/14* (2013.01)

(58) Field of Classification Search
CPC ......... H02K 9/06; H02K 15/03; H02K 15/165
USPC .......................................................... 310/43
See application file for complete search history.

(56) References Cited

U.S. PATENT DOCUMENTS

| | | | |
|---|---|---|---|
| 3,303,995 A * | 2/1967 | Boeckel | F04D 19/002 415/79 |
| 4,074,156 A * | 2/1978 | Widstrand | H02K 9/06 165/47 |
| 4,428,719 A | 1/1984 | Hayashibara et al. | |
| 4,588,911 A * | 5/1986 | Gold | H02K 13/02 310/194 |
| 4,670,677 A * | 6/1987 | Snider | H02K 9/06 310/60 R |
| 4,689,507 A * | 8/1987 | Baker | H02K 9/06 310/414 |
| 4,838,762 A | 6/1989 | Savage et al. | |
| 4,882,510 A * | 11/1989 | Newberg | H02K 9/06 310/63 |
| 5,183,222 A | 2/1993 | Ramsey, Jr. | |
| RE34,268 E | 6/1993 | Muller | |
| 5,654,598 A | 8/1997 | Horski | |
| 6,360,703 B1 | 3/2002 | Rahbar et al. | |
| 6,552,464 B1 | 4/2003 | Rahbar et al. | |
| 6,625,868 B2 | 9/2003 | Rahbar et al. | |
| 7,052,236 B2 | 5/2006 | Chang et al. | |
| 7,157,872 B1 | 1/2007 | Tang | |
| 7,442,010 B2 | 10/2008 | Gruber et al. | |
| 8,303,274 B2 | 11/2012 | Winkler | |

(Continued)

FOREIGN PATENT DOCUMENTS

CN          2640110          8/2003

*Primary Examiner* — Robert W Horn
(74) *Attorney, Agent, or Firm* — Emerson, Thomson & Bennett LLC; Roger D. Emerson

(57) ABSTRACT

Provided is a rotor assembly for a brushless direct current motor. The rotor assembly includes an insert which fits within an outer rotor cup. The insert locates the position of the magnets and secures them with extended features. Curved fan blades are integrated into the insert to provide improved airflow and cooling during rotation. The insert has features incorporated to reduce overall noise caused by air flow by having smooth transitions between mating surfaces and joints. A trench is incorporated within the insert to provide an overflow catch for excess adhesive when the magnet segments are "glued" into place.

20 Claims, 7 Drawing Sheets

(56) References Cited

U.S. PATENT DOCUMENTS

| | | |
|---|---|---|
| 8,456,043 B2 | 6/2013 | Jeung |
| 8,568,110 B2 | 10/2013 | Takeshita |
| 8,922,082 B2 | 12/2014 | Kwon |
| 2018/0109164 A1* | 4/2018 | Holman .................. H02K 9/06 |
| 2018/0262094 A1* | 9/2018 | Blankemeier ............ H02K 9/06 |

* cited by examiner

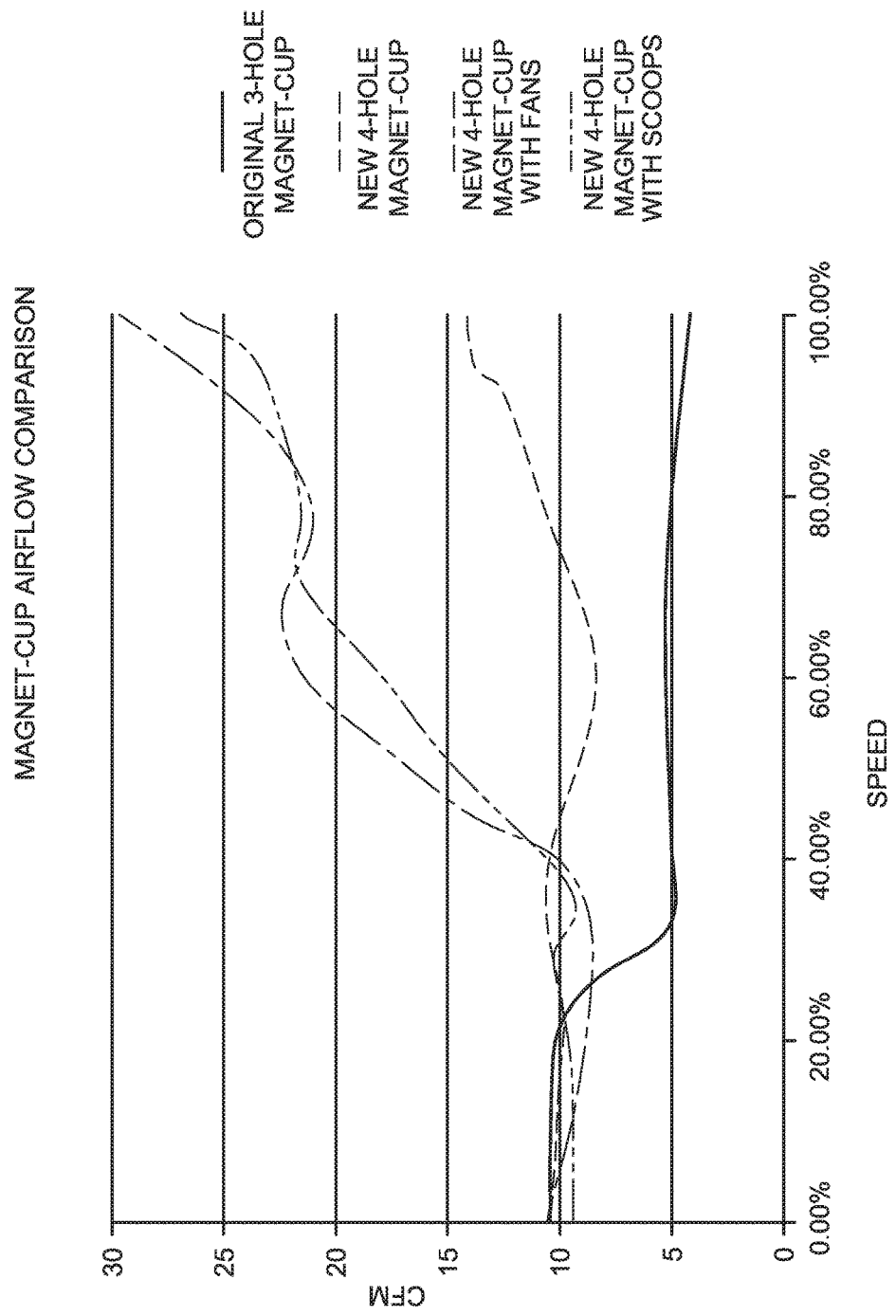

BRUSHLESS DIRECT CURRENT MOTOR WITH INTEGRATED FAN

I. BACKGROUND

A. Technical Field

The present disclosure generally relates to a brushless direct current motor assembly which is designed for use in various types of small motor applications.

B. Description of Related Art

Direct current (DC) motors typically include a stator which provides a constant magnetic field and a rotating armature which constitutes a series of electrical coils. A permanent magnet stator pole is used for small DC motors. For larger motors, an electromagnet is used for the stator with the field coil of the electro-magnet being powered from the same DC power source that is used to power the armature. The armature is connected to a direct current power source (e.g., a battery) through a pair of commutator rings. Spring loaded commutator brushes are used to maintain contact between the commutator and the power source. The power source provides a direct current through the armature or coil. This electrical current imparts an electromotive force on the armature causing the coil to rotate. The commutator rings each connect with a power source of opposite polarity. This results in electricity always flowing away from the commutator on one side of the armature and electricity always flowing towards the commutator on the other side of the armature. This ensures that the torque action is always in the same direction in the armature so that it will continue rotating. In most DC motors, the armature loops of electrical coils are fitted within slots of steel layers within the armature to enhance magnetic flux interaction.

Due to the fact that brushes within DC motors tend to wear out, brushless DC motors have been developed for use in applications which require long life and reliability. A brushless DC motor (BLDC) includes a rotor which is a permanent magnet and a stator having a coil arrangement which is fitted within the rotor. The coil arrangement includes a series of coil loops adjacent to one another in a circular arrangement. By applying electrical current to the coil, the coil energizes and becomes an electromagnet. Operation of the BLDC is based on the interaction of forces between the permanent magnet and the electromagnet formed within the coil arrangement of the stator. As a first coil loop is energized, the opposite ends of the rotor and stator are attracted to each other, causing the rotor to rotate and approach a second coil loop. The second coil loop is then energized causing the rotor to rotate to a third coil loop. This process continues until the rotor completes a complete revolution around the stator. A constant torque of the rotor around the stator is obtained by energizing the coil loop located behind the primary coil loop that is being energized. This generates an electromotive force interacts with the opposite end of the magnet on the rotor and helps rotate the rotor along its axis. To cool the BLDC motor, a fan is typically attached to a shaft which extends through the center hub of the rotor and stator.

With respect to the manufacture of BLDC motors, the current method for attaching magnets within the rotor is difficult and time consuming as the magnets must be evenly spaced and glued into position with a special handheld tool. This tool must be inserted within the rotor prior to the insertion of the magnets into the rotor to provide accurate spacing.

Another disadvantage of current brushless direct current motor designs is that the fans which are used to cool the motor are positioned relatively far away from the rotor and stator assembly. This results in a much larger motor design than that which may be required or necessary for a particular device or application. Furthermore, improving BLDC design to manufacture smaller motors can have the beneficial effect of reducing overall weight which can in turn result in reduced energy output required to operate the motor and improved efficiency as well as a reduction in manufacturing costs. Further reduction in manufacturing costs may be obtained by providing a more automated process for assembling the component parts of a BLDC motor. In addition, greater improvements in efficiency may be obtained by providing an improved fan design which allows improved air flow and cooling to the motor.

In summary, the present brushless direct current motor design allows for easier assembly of component part, elimination of special tools for assembly and installation of the component parts, reduced in manufacturing and assembly costs, reduced installation time of the component parts, improved fan blade geometry for greater cooling efficiency and improved motor performance. The brushless direct current motor provided herein includes several features which result in improved efficiencies in both assembly and operation as discussed above.

II. SUMMARY

Provided is a rotor assembly for a brushless direct current motor. The rotor assembly includes an outer rotor cup which includes a center hub and which houses a brushless direct current motor within an interior portion, wherein the center hub of the outer rotor cup is formed within an inner member and wherein at least one opening is formed between the inner member and an outer member of the outer rotor cup; an insert having a center hub, an interior portion and at least one curved fan blade which is integrated as a component part of the insert, wherein the fan blade is positioned within at least one opening formed between an inner member and an outer member of the insert; at least two segmented magnets each of which is slip fitted between at least two vertical pegs on the insert; and a shaft which fits through the center hub of the rotor cup and the insert and which connects the brushless rotor assembly to a motor, wherein the insert is sized to fit within the rotor cup.

According to further embodiments of the rotor assembly, the outer rotor cup and the insert have a circular configuration, the inner member and the outer member of the outer rotor cup and the insert have a circular configuration and the outer rotor cup is formed from a metal material and the insert is formed from a plastic material.

According to further embodiments of the rotor assembly, the outer rotor cup and the plastic insert each include four cross members which extend between the inner circular member and the outer circular member of the outer rotor cup and the insert; the four cross members, the inner circular member and the outer circular member form four openings within the outer rotor cup and the plastic insert; each of the four openings within the plastic insert houses at least one curved fan blade; and the four openings within the outer rotor cup form a profile which matches that of the four openings of the plastic insert.

According to further embodiments, the rotor assembly includes four segmented magnets each of which is slip fitted between two vertical pegs on the plastic insert, wherein the plastic insert includes a total of four vertical pegs.

According to further embodiments of the rotor assembly, the plastic insert is slip fitted within the outer rotor cup.

According to further embodiments of the rotor assembly, the plastic insert comprises at least one fillet.

According to further embodiments of the rotor assembly, a fillet is present within each of the four pegs of the plastic insert.

According to further embodiments of the rotor assembly, each of the four segmented magnets are slip fitted within the outer rotor cup between two of the four vertical pegs on the plastic insert.

According to further embodiments of the rotor assembly, the outer circular member of the plastic insert includes a bottom side which includes a trench between each of the four pegs and wherein each of the four magnets are slip fitted between two pegs and the magnets rest on a top portion of the trench.

According to further embodiments of the rotor assembly, the adhesive is applied to the backside of each of the four segmented magnets to secure the four segmented magnets to the outer rotor cup. According to further embodiments, the adhesive may be applied to the inner surface outer rotor cup (magnet cup) to secure the four segmented magnets to the outer rotor cup.

According to further embodiments of the rotor assembly, the four cross members which extend between the inner circular member and the outer circular member of the plastic insert are cored out to form a cored out section between two sidewalls, wherein the sidewalls extend around the openings of the insert and wherein the cored out section and two sidewalls form a smooth transition between mating surfaces of the outer rotor cup and the insert.

According to further embodiments of the rotor assembly, the outer rotor cup and the plastic insert have a common cross-sectional thickness.

According to further embodiments of the rotor assembly, the fan blades are positioned at angles relative to plastic insert to allow for an opening to be present on either side of the blades to create a laminar flow of air over the blades and to force a downdraft of air over the motor to be cooled.

According to further embodiments of the rotor assembly, the fan blades are forward curved.

According to further embodiments of the rotor assembly, the fan blades protrude through the openings of the outer rotor cup and past the outer rotor cup's outer surface to provide an improved scooping action to force additional air through each opening within the plastic insert.

According to further embodiments of the rotor assembly, the fan blades have an airfoil shape to improve efficiency of air flow by reducing drag of the rotating components at low and high speeds and to provide increased airflow to cool the motor.

According to further embodiments of the rotor assembly, the fan blades are positioned so that they fill in any gaps present between magnet spacing.

According to further embodiments of the rotor assembly, the outer rotor cup, the plastic insert and the segmented magnets of the rotor assembly are balanced through a machining process.

Also provided is a method of assembling a rotor assembly with a brushless direct current motor. The method includes the following steps: providing an outer rotor cup which includes a center hub and which houses a brushless direct current motor within an interior portion, wherein the center hub of the outer rotor cup is formed within an inner member and wherein at least one opening is formed between the inner member and an outer member of the outer rotor cup; providing an insert having a center hub, an interior portion and at least one curved fan blade which is integrated as a component part of the insert, wherein the fan blade is positioned within at least one opening formed between an inner member and an outer member of the insert; providing at least two segmented magnets; slip fitting the insert within the outer rotor cup; slip fitting the at least two segmented magnets between at least two vertical pegs on the insert; fitting the brushless direct current motor within the interior portion of the outer rotor cup and the insert; and press fitting a shaft through the center hub of the rotor cup and the insert.

Also provided is a rotor assembly for a brushless direct current motor which includes the following components: an outer rotor cup having a circular configuration which includes a center hub and which houses a brushless direct current motor within an interior portion, wherein the center hub of the outer rotor cup is formed within an inner member and wherein the outer rotor cup includes four openings formed between two cross members which extend between the inner member and an outer member of the outer rotor cup, the inner member and outer member of the outer rotor cup having a circular configuration; a plastic insert having a center hub, a circular configuration and four curved fan blades which are integrated as a component part of the insert, wherein the fan blades are positioned within four openings formed between two cross members which extend between an inner member and an outer member of the insert, the inner member and outer member of the insert having a circular configuration, wherein the insert comprises four cross members in total, wherein each of the four openings within the insert houses at least one curved fan blade; four segmented magnets each of which is slip fit between two vertical pegs on the insert wherein the insert includes four vertical pegs; a shaft which fits through the center hub of the rotor cup and the insert, wherein the insert is sized to fit within the rotor cup; wherein the four openings within the outer rotor cup form a profile which matches that of the four openings of the insert; wherein the insert is slip fitted within the outer rotor cup; wherein the outer rotor cup comprises an inner surface, wherein the four pegs on the insert each include a fillet; wherein each of the four segmented magnets which are slip fit between two of the four vertical pegs on the plastic insert are adhered to the inner surface of the outer rotor cup with an adhesive; wherein the outer circular member of the plastic insert includes a bottom side which includes a trench between each of the four pegs and wherein each of the four magnets are slip fitted between the two pegs on a top surface of the trench; wherein the four cross members which extend between the inner circular member and the outer circular member of the outer rotor cup and the insert are cored out to form a cored out section between two sidewalls, wherein the sidewalls extend around the openings of the insert and wherein the cored out section and two sidewalls form a smooth transition between mating surfaces of the outer rotor cup and the insert; wherein the outer rotor cup and the insert comprise a common cross-sectional thickness; wherein the fan blades are positioned at angles relative to insert to allow for an opening to be present on either side of the blades to create a laminar flow of air over the blades and to force a downdraft of air over the motor to be cooled; wherein the fan blades are forward curved; wherein the fan blades protrude through the openings of the outer rotor cup and past the outer rotor cup's outer surface to provide an improved scooping action to force additional air through each opening within the insert; wherein the fan blades comprise an airfoil shape to improve efficiency of air flow by reducing drag of the rotating components at low and high speeds and to provide increased airflow to cool the motor; wherein the fan blades are positioned so that they fill in any gaps present between magnet spacing; and wherein the outer rotor cup, the plastic insert and the segmented magnets of the brushless direct current motor assembly are balanced through a machining process.

Other benefits and advantages of this invention will become apparent to those skilled in the art to which it pertains upon reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein:

FIG. 7 is a graph showing the airflow speed for different types of magnet cup assemblies or rotor assemblies running at various electrical outputs.

IV. DETAILED DESCRIPTION

Figure 1:
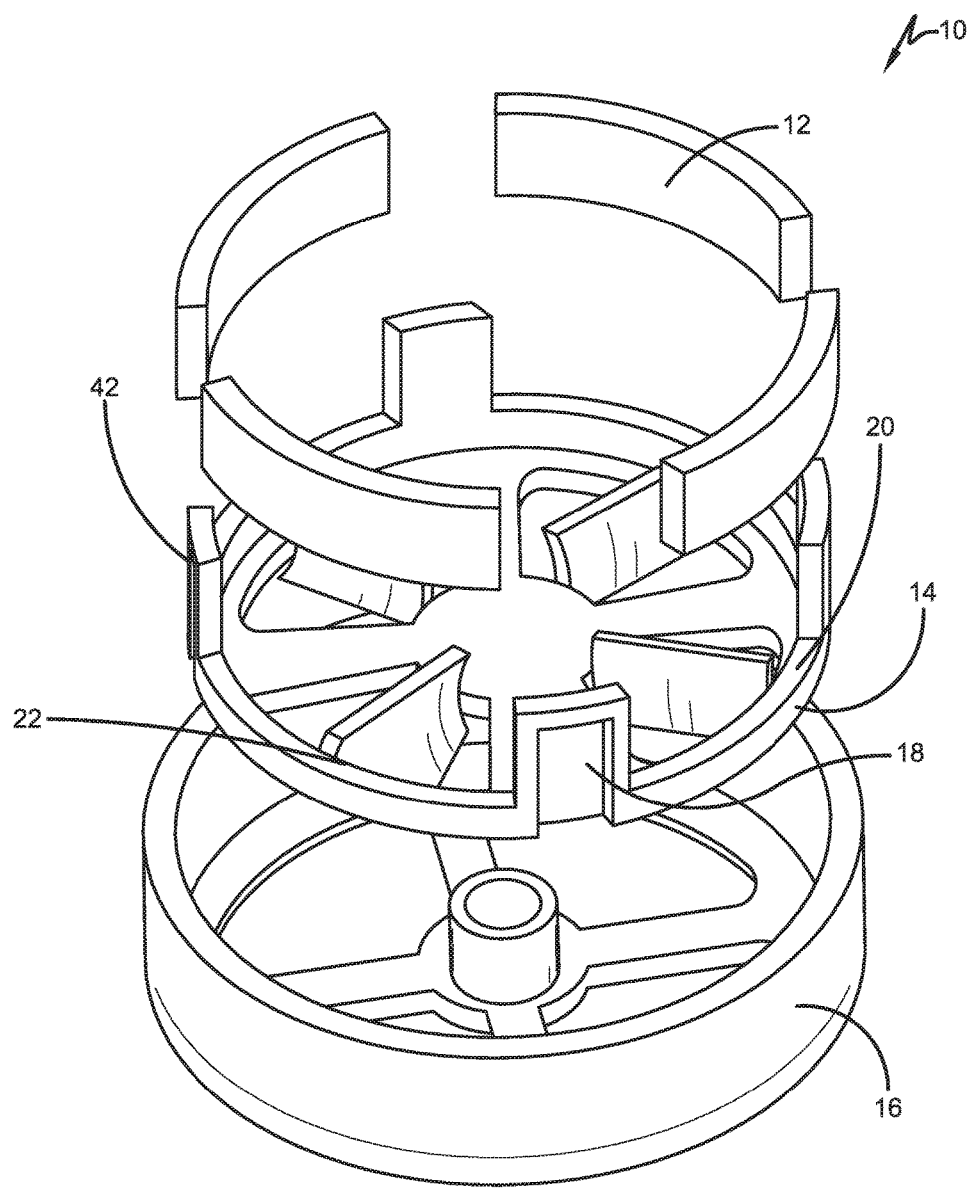
FIG. 1 is an isometric exploded view of an exemplary rotor assembly for a brushless direct current motor.

Brushless direct current motors are used in OEM equipment for consumer use in blenders, vacuum cleaners, air compressors, blowers (high speed), large scale printers, hospital beds, and other small powered consumer and industrial devices.

The present disclosure relates to a rotor assembly for a brushless direct current motor. In addition, the present disclosure also relates to a brushless direct current motor assembly, a method of assembling a rotor assembly for a brushless direct current motor, a method of assembling a brushless direct current motor and a method of operating a brushless direct current motor. The rotor assembly (also referred to as a magnet cup assembly) includes an insert which is positioned within an outer rotor cup for a brushless direct current (DC) motor. The insert may be formed from a plastic material although in certain embodiments, it is also possible to form the insert from other materials including various types of metals. The outer rotor cup may be formed from various types of metal materials. A motor shaft is fitted within a central hub of the insert and outer rotor cup. The brushless direct current motor is connected to the insert and the outer rotor cup through the motor shaft and is positioned or fitted within the interior portions of the insert and the outer rotor cup to provide a brushless direct current motor assembly having a significantly reduced size compared to previously manufactured brushless direct current motors.

The insert includes fan blades which are integrated as a component part of the insert. In certain embodiments, the fan blades are curved to provide improved airflow and cooling during rotation of the rotor or outer rotor cup. The insert may include at least one fan blade which is positioned within at least one opening that is formed within a cross-sectional frame. In certain embodiments, the insert includes four fan blades, each of which are positioned within four openings formed from a cross-sectional frame. In certain embodiments, the fan blades are molded into the walls which form the insert fan openings although it is also possible to attach the blades as a separate component within the insert fan openings. The fan blades may be positioned at angles relative to the flat surface of the rotor cup to allow for holes to be open on either side of the fan blades. However, it is also possible to position the fan blades so that a hole is open on only one side of the blade. In certain embodiments, the fan blades protrude past a corresponding outer rotor cup opening which matches the profile of the insert fan blade opening. This design provides an improved "scooping" action to force more air through each of the openings of the outer rotor cup and insert. In certain embodiments, the fan blades are forward curved, which when rotated clockwise acts as an axial fan to push air parallel to the shaft of the motor or along the axis of revolution. This design may be used to prevent air barriers during lower speeds by allowing air to pass freely through the openings of the insert and outer rotor cup. In certain embodiments, the geometry of the fan blades is an airfoil shape which improves overall efficiency of the moving air and creates a laminar flow of air over the blades, forcing a downdraft over the motor that is to be cooled. Fans having an airfoil shape may be used to reduce drag of the rotating components at low and high speeds and to provide increased airflow to cool the motor. With improved airflow, the motor may be cooled in a more efficient and improved manner. Current designs do not have fan designs which allow for better airflow. In addition, in current designs, fans are placed further away from the motor. This results in larger brushless direct current motor assemblies compared to that of the present disclosure.

A comparison of the improved airflow results of the design of the present disclosure to currently available magnet-cup assemblies is provided in FIG. 7. As shown within FIG. 7 and the data provided below, the design of the present disclosure (i.e., the 4-hole magnet-cup with fans) exhibited dramatically improved airflow results measured in terms of cubic feet per minute over the original 3-hole magnet cup design that is currently being used within brushless direct current motor assemblies. Airflow was measured in terms of cubic feet per minute. Airflow measurements were taken at different levels of speed capacity of the magnet-cup rotor assembly. Speed capacity was based on the amount of applied voltage to the motor. As shown in the data below and within the graph of FIG. 7, the magnet-cup rotor assembly of the present design exhibited an airflow of 29.59 cubic feet per minute which was far superior to that of the previous design which exhibited an airflow 4.19 cubic feet per minute.

TABLE 1

| Original 3-hole Magnet-Cup | | |
|---|---|---|
| CTL V | Speed | CFM |
| 0 | 0.00% | 10.47463 |
| 1.7 | 22.67% | 9.846154 |

TABLE 1-continued

Original 3-hole Magnet-Cup

| CTL V | Speed | CFM |
|---|---|---|
| 2.4 | 32.00% | 5.237316 |
| 3 | 40.00% | 4.97545 |
| 3.4 | 45.33% | 4.97545 |
| 4 | 53.33% | 5.080196 |
| 4.6 | 61.33% | 5.237316 |
| 5.6 | 74.67% | 5.132569 |
| 7.5 | 100.00% | 4.18985 |

TABLE 2

New 4-hole Magnet-Cup

| CTL V | Speed | CFM |
|---|---|---|
| 0 | 0.00% | 10.47463 |
| 1.8 | 24.00% | 9.846154 |
| 2.2 | 29.33% | 10.36989 |
| 3 | 40.00% | 10.47463 |
| 4.5 | 60.00% | 8.379705 |
| 5.9 | 78.67% | 10.68412 |
| 6.9 | 92.00% | 12.62193 |
| 7 | 93.33% | 13.61702 |
| 7.5 | 100.00% | 14.14075 |

TABLE 3

4-hole Magnet-Cup with Fans

| CTL V | Speed | CFM |
|---|---|---|
| 0 | 0.00% | 10.47463 |
| 1.6 | 21.33% | 8.79869 |
| 2.8 | 37.33% | 9.270049 |
| 3.4 | 45.33% | 14.14075 |
| 3.9 | 52.00% | 17.80687 |
| 4.4 | 58.67% | 20.89689 |
| 5 | 66.67% | 22.52046 |
| 5.8 | 77.33% | 20.94926 |
| 6.5 | 86.67% | 22.88707 |
| 7 | 93.33% | 25.87234 |
| 7.5 | 100.00% | 29.59083 |

TABLE 4

4-hole Magnet-Cup with Scoops

| CTL V | Speed | CFM |
|---|---|---|
| 0 | 0.00% | 9.427168 |
| 1.6 | 21.33% | 9.689034 |
| 2.2 | 29.33% | 10.21277 |
| 2.7 | 36.00% | 9.374795 |
| 3.5 | 46.67% | 13.30278 |
| 4 | 53.33% | 15.81669 |
| 4.5 | 60.00% | 17.96399 |
| 5.3 | 70.67% | 21.57774 |
| 6 | 80.00% | 21.68249 |
| 7.1 | 94.67% | 23.56792 |
| 7.5 | 100.00% | 26.76268 |

The shape of the insert also provides smooth transitioning features between the outer rotor cup and the magnet segments as the spacing between the component parts (i.e., the outer rotor cup, magnet segments and insert) is minimal. The transitioning features include small radii or fillets as well as chamfered edges. These help eliminate sharp corners, edges, and any gaps that may contribute to noise levels from rotating parts. The insert also includes features which fill in the gaps between the magnet spacing. For example, in certain embodiments, the insert may include pegs which are positioned between two segmented magnets to close any gap of space between the magnets. The rotor assembly also includes smooth transitions between the mating surfaces and joints of its component parts. For example, the top surface of the insert may include a raised sidewall which surrounds the four fan blade openings. The distance between the sidewalls of the insert (i.e., the distance between the sidewalls of two different fan blade openings on the insert) may be sized to fit the four cross members which form the four openings of the outer rotor cup. This design allows the bottom surface of outer rotor cup to fit within and engage the top surface of the insert in an integral manner. By having such smooth transitions between mating surfaces and joints, the insert functions to reduce overall noise caused by air flow. Rotation of the assembly (i.e., the insert and the rotor) may be clockwise or counter-clockwise and may vary from low to high speeds. In certain embodiments, rotation of the assembly is clockwise.

The insert also functions to locate the position of several segmented magnets and secures them within the rotor assembly. This is accomplished by positioning and fitting (e.g., by slip fitting) at least one segmented magnet between two pegs. In certain embodiments, the insert includes four pegs which hold four segmented magnets in place. In certain embodiments, each of the four pegs include a grooved section (also referred to as a fillet) which is formed therein. In certain embodiments, the engagement between the insert and the outer rotor cup is through a slip fit. In other words, the insert is slid into position to fit within the outer rotor cup. The slots and pegs work in conjunction to align and hold the insert and magnet segments within the outer rotor cup and allow for optimum balancing of the assembly. In alternative embodiments, the outer rotor cup and the insert may include a male extension and a corresponding female receptacle to assist in securing the insert to the outer rotor cup.

In certain embodiments, the segmented magnets may be secured to the insert and the rotor cup through the use of an adhesive. Securement of the segmented magnets through the use of an adhesive may be in addition to or in place of a slip fit of the segmented magnets within the insert. The insert may also include a trench which provides an overflow catch for excessive adhesive when the magnet segments are glued into place. In embodiments where the insert includes a trench, the segmented magnets slip fitted on a top surface of the trench between two pegs. This feature provides an improvement to the current method of attaching magnets in which the process for evenly spacing and adhering the magnets into position is difficult. With the current method, a handheld tool is required to be inserted into the assembly prior to the insertion of the magnets to provide for accurate spacing. With the present device, an adhesive is first applied to either the back of the magnet segment or the inner wall or interior of the magnet cup. The magnets are placed into position over the top surface of the trench with a custom tool to space them apart correctly. If needed, a fine adjustment can be made to position each magnet prior to the adhesive setting. The assembly is then placed on a balancing machine to remove material from the outside of the outer rotor cup (e.g., metal) until the rotor assembly is within balance specification. The shaft of the motor is then attached into the center hub of the magnet cup. Several processes later, the external fan blades are attached to the shaft of the motor. This attachment, whether for single or multi-stage fans, is balanced by removing material from the fans themselves.

This overall process involves two areas of balancing—one for the outer rotor cup and one for the fan blades of the insert.

To assemble the integrated fan into the outer rotor cup, the insert is slip fitted or slid within the rotor cup. Magnetic segments are then slip fitted into various sections within the insert. For example, the magnet segments may be slip fitted between two pegs and on a top surface of a trench present within the insert. Slip fitting encompasses sliding the four segmented magnets into position between the two pegs of the insert which is already installed within the outer rotor cup. The magnet segments are held at a height determined by the depth of the insert sections they rest on. The location of the magnet segments is determined by the position of the four vertical pegs on the insert which hold the magnet segments in a static position. In certain embodiments, the insert is designed to be a two-piece mold which reduces complexity and cost in tooling. Various sections of the insert (e.g. sections from the cross sectional frame and other sections) may be cored out and/or grooved to reduce the weight of the insert. A common cross-sectional thickness may be applied throughout the remaining areas of the insert to allow for better moldability and weight distribution. Also, the fan blade openings within the outer rotor cup are significantly increased in order to match the profile of the fan blade openings of the plastic insert. This greatly reduces the mass of the assembled rotor cup. In certain cases, the size of the fan blade openings within the outer rotor cup and the plastic insert are dependent upon the size and application of the motor.

Once fully assembled, the rotor cup assembly may be balanced through a machining process. Balancing is improved with the present design in that variability in the positioning of the magnets is reduced and overall weight of the insert and rotor cup is reduced. This had been a prevalent problem in the past. The current design allows for reliable repeatability by reducing variables in the assembly process. Tighter tolerances for positioning the magnets can be achieved due to the direct fit of mating parts.

In summary, insertion and attachment of the magnets into the rotor involves the following steps. First, the plastic insert is positioned within the outer rotor cup. Next, an adhesive is applied to either the backside of a magnet segment and/or the inner wall of the magnet cup within the assembly. The magnets are then placed into position with a custom tool to space them apart correctly. If needed, fine adjustment of the positioning of the magnets can be made prior to the setting of the adhesive. The assembly is then placed on a balancing machine to remove material until the rotor assembly is within the proper balance specification. After the rotor assembly is balanced, the shaft of the motor is attached into the center hub of the rotor. Several processes later, the fan blades or stages of fans are attached to the shaft of the motor. The attachment of the fan may constitute an attachment of either single or multi-stage fan. Balancing of the fan may be accomplished by removing material from the fan itself. Thus, the overall assembly process involves balancing of the rotor and balancing of the fan blades. After the rotor assembly is balanced, it is installed into a housing and over an inner stator of the brushless direct current motor.

Referring now to the drawings, FIG. 1 illustrates an isometric exploded view of a rotor assembly (10) for a brushless direct current motor. The rotor assembly (10) includes four segmented magnets (12), a plastic insert (14) and a rotor cup assembly (16) (also referred to as a magnet cup assembly). The plastic insert (14) includes four grooved sections or fillets (18) within pegs (42) and four magnet holding sections (20). The four magnet holding sections (20) include a trench (22) for holding the magnets (12). FIG. 1 illustrates various progressions of the assembly process. In one embodiment, the plastic insert (14) is slip fit to the rotor cup assembly (16) by lowering the plastic insert (14) into the rotor cup assembly (16). The plastic insert (14) is secured to the rotor cup assembly (16) by adhesively bonding the segmented magnets to the inner sidewall of the rotor cup assembly (16). After insertion of the plastic insert (14) into the rotor cup assembly (16), the four segmented magnets (12) are slip fit within the corresponding four magnet holding sections (20) over the top surface of the trench (22) of the plastic insert (14). An adhesive or glue may be applied to the backside of the magnets (12) and/or the inner sidewall of the rotor cup assembly (16) to improve the connection of the magnets (12) to the plastic insert (14).

Figure 2:
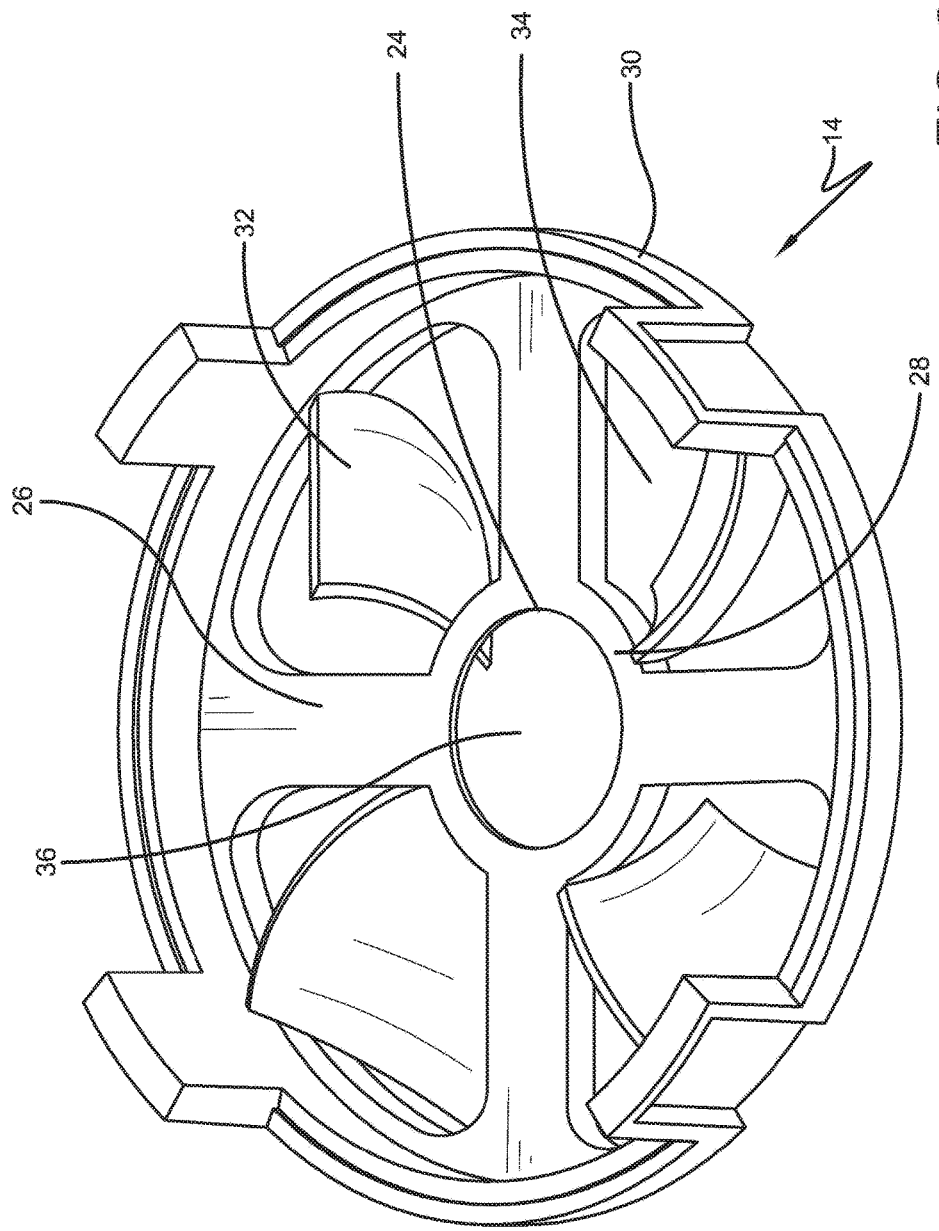
FIG. 2 is a bottom view of an exemplary insert of a rotor assembly for a brushless direct current motor.

FIG. 2 illustrates a bottom view of the plastic insert (14) by itself. As shown within FIG. 2, the plastic insert (14) includes a central hub (24), four cross members (26), an inner circular member (28), an outer circular member (30) and four fan blades (32). The four fan blades (32) are located within four openings (34) of the plastic insert (14) which are formed between two cross members (26), the inner circular member (28) and the outer circular member (30). The central hub (24) includes an opening (36) for receiving a shaft (not shown). When connected to the plastic insert (14), rotation of the shaft allows for rotation of the plastic insert (14). Rotation of the plastic insert (14) may be clockwise or counterclockwise and may vary from low to high speeds. In certain embodiments, rotation of the plastic insert (14) is clockwise. The fan blades (32) are placed at angles relative to the flat surface of the plastic insert (14) to allow for an opening (34) to be present on either side of the blades (32). This prevents air barriers during lower speeds by allowing air to pass freely through the openings (34). The geometry of the blades (32) is an airfoil shape to improve overall efficiency of the moving air. This creates a laminar flow of air over the blades (32) and forces a downdraft over the motor to be cooled.

Figure 3:
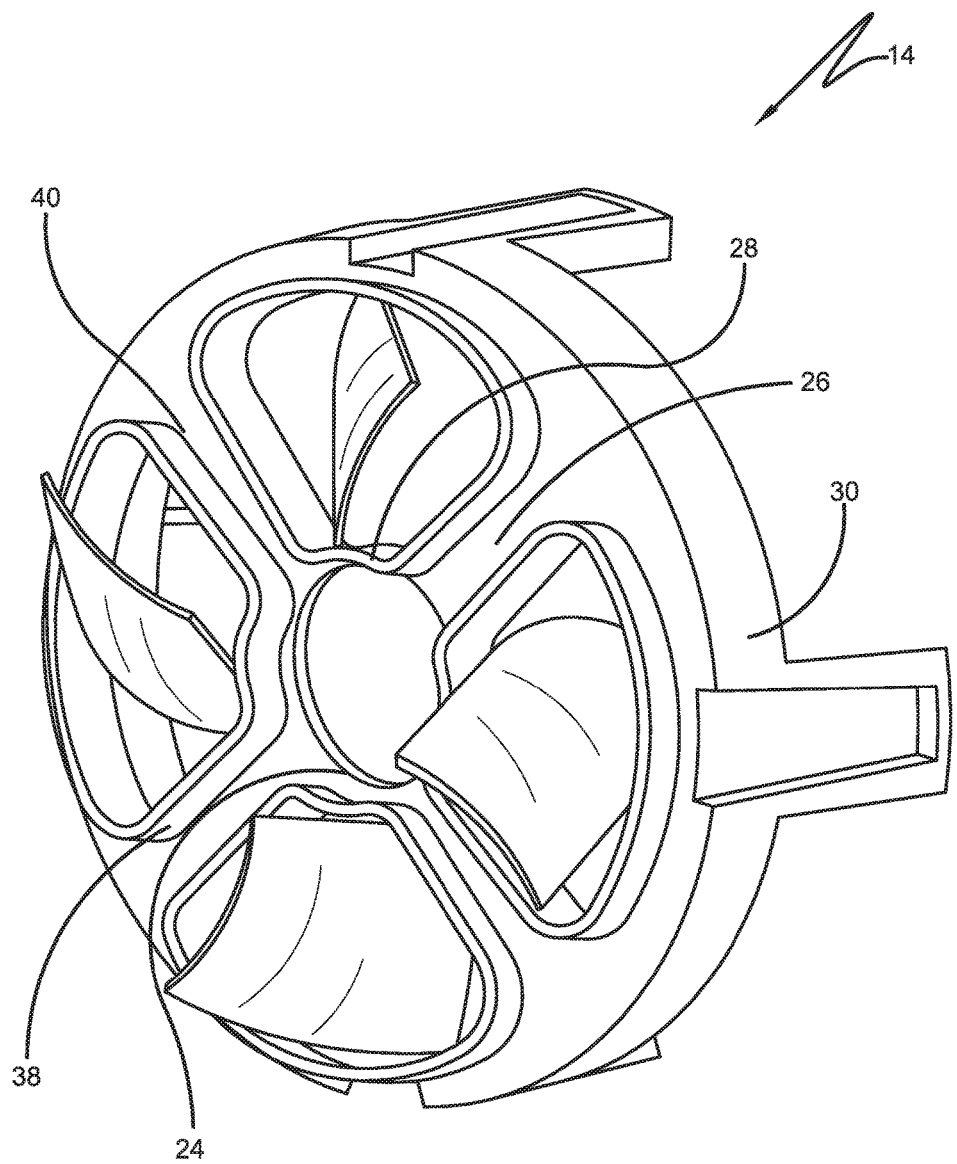
FIG. 3 is an isolated isometric view of an exemplary insert of a rotor assembly for a brushless direct current motor.

FIG. 3 illustrates an isolated isometric view of the plastic insert (14) by itself. As shown in FIG. 2, the plastic insert (14) includes a central hub (24), four cross members (26), an inner circular member (28), an outer circular member (30) and four fan blades (32). The four fan blades (32) are located within four openings (34) of the plastic insert (14) which are formed between two cross members (26), the inner circular member (28) and the outer circular member (30). Each of the four openings (34) include a sidewall (38) which extends around the opening (34) and is raised from the flat outer surface (40) of the plastic insert (14). As such, this view shows that the thick sections of the plastic insert (14) have been cored out to reduce the weight of the part. The entire plastic insert (14) has a common cross-sectional thickness for better moldability and weight distribution. FIG. 3 further illustrates the grooved sections or fillets (18) within the plastic insert (14).

Figure 4:
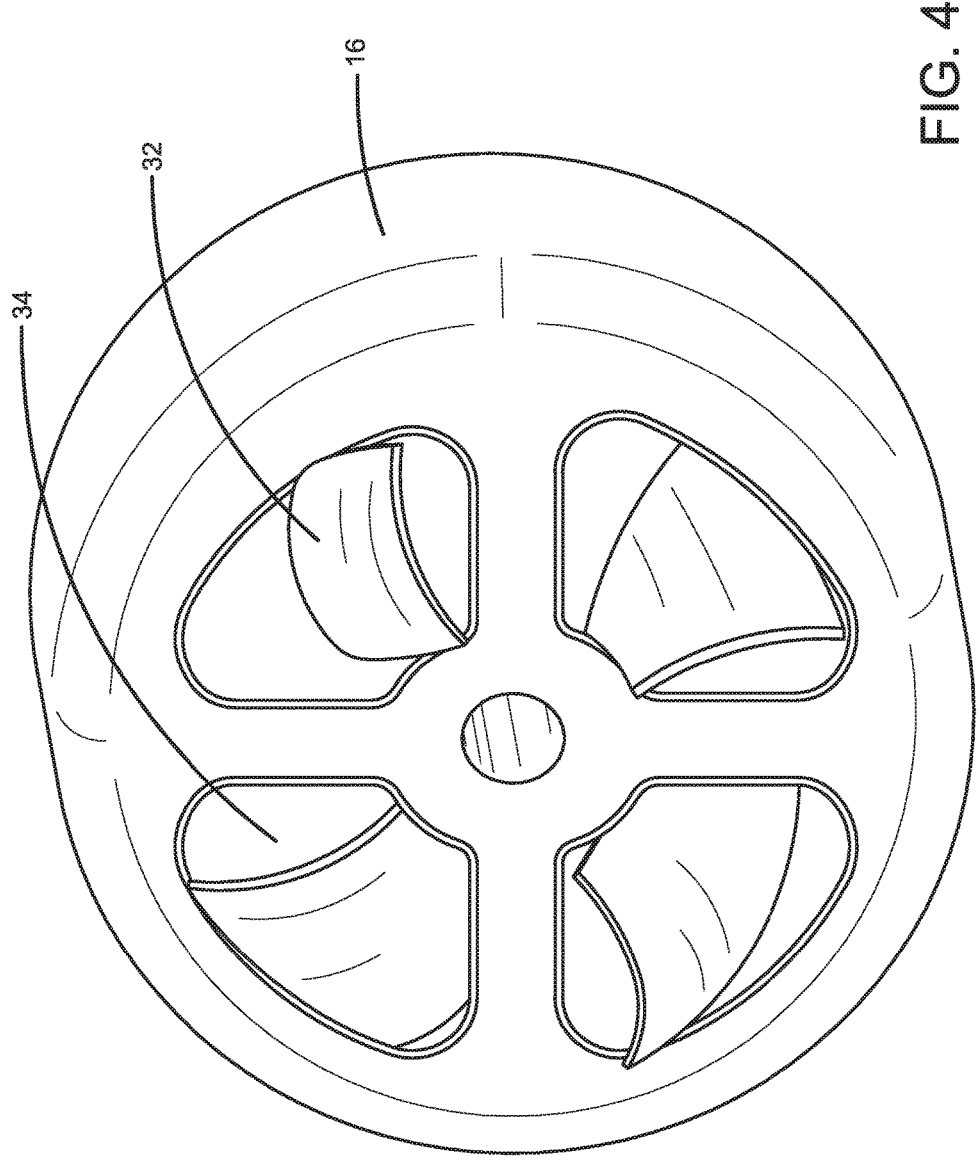
FIG. 4 is a front isometric view of an exemplary outer rotor cup of a rotor assembly for a brushless direct current motor.

FIG. 4 illustrates a front isometric view of a rotor cup assembly (16) with the plastic insert (14) installed. As shown within FIG. 4, the fan blades (32) protrude past the rotor cup assembly (16) to provide an improved "scooping" action to force additional air through each opening (34). The fan blades (32) are forward curved which when rotated clockwise acts as an axial fan to push air parallel to the shaft of the motor or along the axis of revolution. Each fan blade (32) has a cross-sectional "airfoil" shape to improve efficiency by reducing drag of the rotating components at low and high speeds and to provide increased airflow to cool the motor.

The shape also provides noise reduction by having smooth transitioning features between the top surface of the insert and the bottom surface of the outer rotor cup in that cross members on the bottom surface of the outer rotor cup directly fit within the corresponding cross members on the top surface of the insert. Smooth transitioning features are also present within the insert in that any gaps that may be present between the fitted segmented magnets are closed off with vertical pegs (42) of the insert. The transitioning features include small radii or fillets as well as chamfered edges. These help eliminate sharp corners, edges, and any gaps that may contribute to noise levels from rotating parts.

Figure 5:
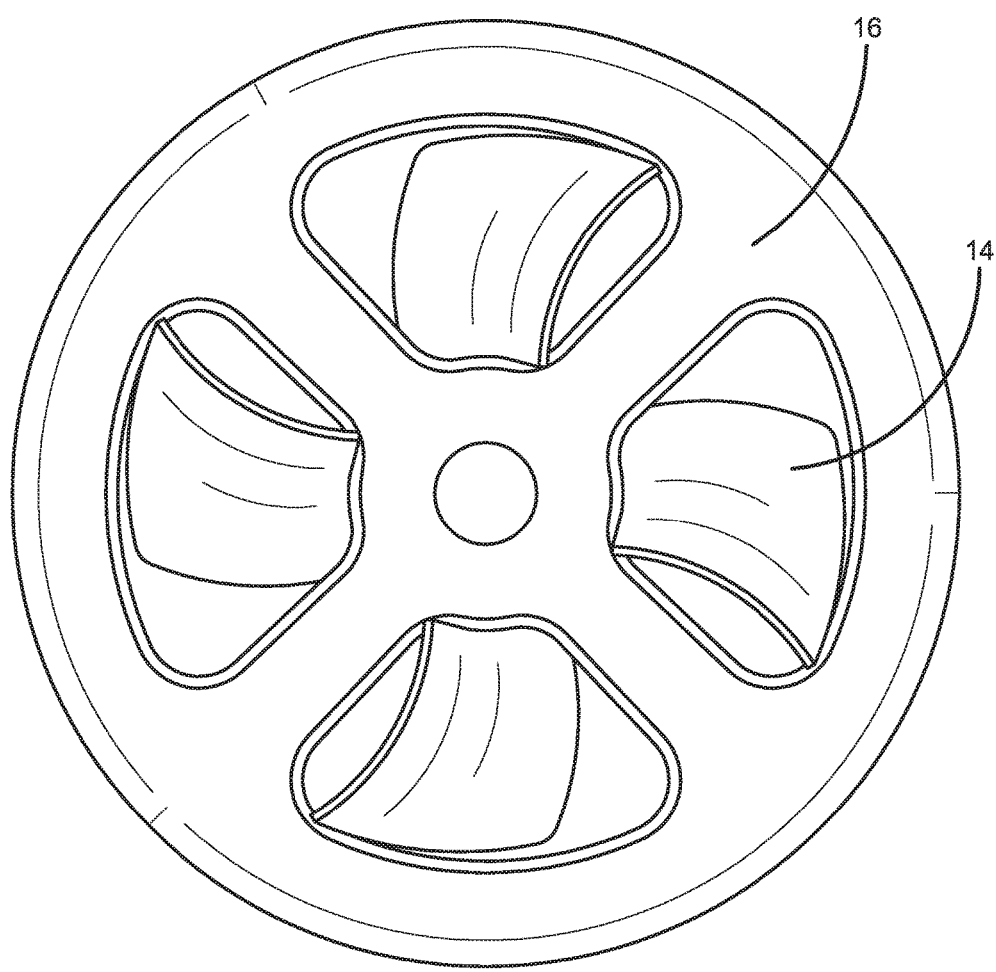
FIG. 5 is a top view of an exemplary rotor assembly for a brushless direct current motor.

FIG. 5 illustrates a top view of the plastic insert (14) installed within the rotor cup assembly (16). Rotation of the assembly is clockwise varying from low to high speeds. The fan blades (32) are placed at angles relative to the flat surface of the rotor cup assembly (16) to allow for holes to be open on either side of the blades. This prevents air barriers during lower speeds by allowing air to pass freely through the openings (34). The geometry of the fan blades (32) is an airfoil shape to improve overall efficiency of the air movement through the openings (34) of the rotor assembly (10). This design creates a laminar flow of air over the blades and forces a downdraft over the motor being cooled.

Figure 6:
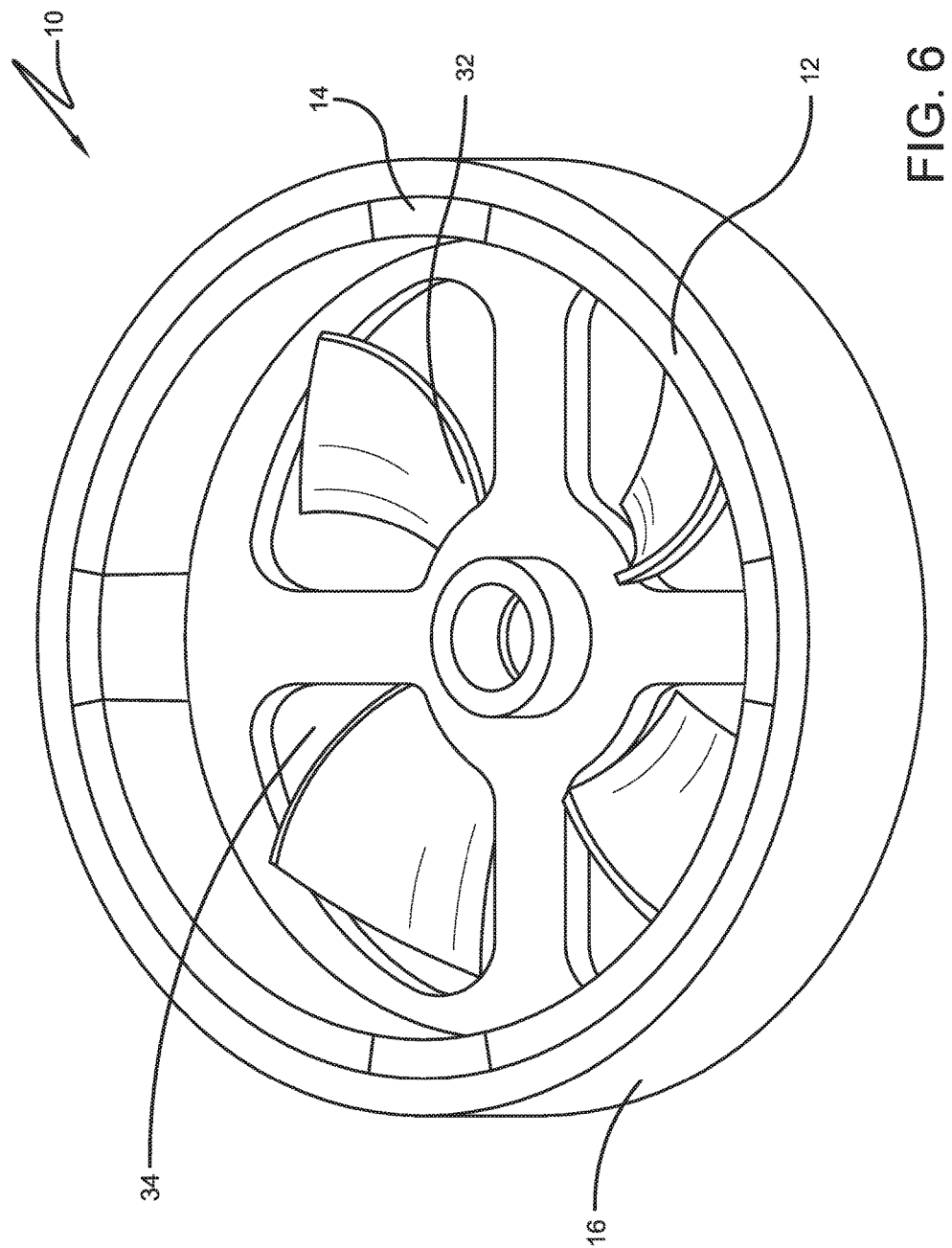
FIG. 6 is a top assembled view of an exemplary rotor assembly for a brushless direct current motor.

FIG. 6 shows a top assembled view of the outer rotor cup (16), plastic insert (14) and magnet segments (12). As shown within FIG. 6, no gaps are present between the magnet segments (12) since the magnet segments (12) are positioned between pegs (42). When fully assembled, the rotor assembly (10) may be balanced through a machining process. With the present design, balancing is improved by reducing variability in the positioning of the magnets. This variability in magnet positioning had been a prevalent problem in past assembly and balancing processes. Also, when compared to previous designs, the openings (34) within the outer rotor cup (16) have increased significantly in order to match the profile of the openings of the plastic insert (14). This results in a significant reduction in the mass of the assembled magnet cup (16). Less mass, in turn, produces quicker and easier balancing for production and more air flow.

Numerous embodiments have been described herein. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof. The phrase "associated with" as used in this document, refers to structures which support the disclosed device and may also refer to structures not disclosed herein capable of supporting the disclosed device. Further, the "invention" as that term is used in this document is what is claimed in the claims of this document. The right to claim elements and/or sub-combinations that are disclosed herein as other inventions in other patent documents is hereby unconditionally reserved.

What is claimed is:

1. A rotor assembly for a brushless direct current motor comprising:
    an outer rotor cup which includes a center hub and which houses a brushless direct current motor within an interior portion, wherein the center hub of the outer rotor cup is formed within an inner member and wherein at least one opening is formed between the inner member and an outer member of the outer rotor cup;
    an insert having a center hub, an interior portion and at least one curved fan blade which is integrated as a component part of the insert, wherein the fan blade is positioned within at least one opening formed between an inner member and an outer member of the insert;
    at least two segmented magnets each of which is slip fitted between at least two vertical pegs on the insert; and
    a shaft which fits through the center hub of the rotor cup and the insert and which connects the brushless rotor assembly to a motor, wherein the insert is sized to fit within the rotor cup.

2. The rotor assembly of claim 1, wherein the outer rotor cup and the insert have a circular configuration, wherein the inner member and the outer member of the outer rotor cup and the insert have a circular configuration and wherein the outer rotor cup is formed from a metal material and the insert is formed from a plastic material.

3. The rotor assembly of claim 2, wherein the outer rotor cup and the plastic insert each include four cross members which extend between the inner circular member and the outer circular member of the outer rotor cup and the insert, wherein the four cross members, the inner circular member and the outer circular member form four openings within the outer rotor cup and the plastic insert, wherein each of the four openings within the plastic insert houses at least one curved fan blade and wherein the four openings within the outer rotor cup form a profile which matches that of the four openings of the plastic insert.

4. The rotor assembly of claim 3, which comprises four segmented magnets each of which is slip fitted between two vertical pegs on the plastic insert, wherein the plastic insert includes a total of four vertical pegs.

5. The rotor assembly of claim 4, wherein the plastic insert is slip fitted within the outer rotor cup.

6. The rotor assembly of claim 5, wherein the plastic insert comprises at least one fillet.

7. The rotor assembly of claim 6, wherein the fillet is present within each of the four pegs of the plastic insert.

8. The rotor assembly of claim 7, wherein each of the four segmented magnets are slip fitted within the outer rotor cup between two of the four vertical pegs on the plastic insert.

9. The rotor assembly of claim 8, wherein the outer circular member of the plastic insert includes a bottom side which includes a trench between each of the four pegs and wherein each of the four magnets are slip fitted between two pegs and wherein the magnets rest on a top portion of the trench.

10. The rotor assembly of claim 9, wherein the adhesive is applied to a backside of each the four segmented magnets to adhere the magnets to the outer rotor cup.

11. The rotor assembly of claim 3, wherein the four cross members which extend between the inner circular member and the outer circular member of the plastic insert are cored out to form a cored out section between two sidewalls, wherein the sidewalls extend around the openings of the insert and wherein the cored out section and two sidewalls form a smooth transition between mating surfaces of the outer rotor cup and the insert.

12. The rotor assembly of claim 11, wherein the outer rotor cup and the plastic insert comprise a common cross-sectional thickness.

13. The rotor assembly of claim 3, wherein the fan blades are positioned at angles relative to plastic insert to allow for an opening to be present on either side of the blades to create a laminar flow of air over the blades and to force a downdraft of air over the motor to be cooled.

14. The rotor assembly of claim 13, wherein the fan blades are forward curved.

15. The rotor assembly of claim 14, wherein the fan blades protrude through the openings of the outer rotor cup and past the outer rotor cup's outer surface to provide an improved scooping action to force additional air through each opening within the plastic insert.

16. The rotor assembly of claim 15, wherein the fan blades comprise an airfoil shape to improve efficiency of air flow by reducing drag of the rotating components at low and high speeds and to provide increased airflow to cool the motor.

17. The rotor assembly of claim 14, wherein the fan blades are positioned so that they fill in any gaps present between magnet spacing.

18. The rotor assembly of claim 12, wherein the outer rotor cup, the plastic insert and the segmented magnets of the rotor assembly are balanced through a machining process.

19. A method of assembling a brushless direct current motor with the rotor assembly of claim 1 comprising:
   providing an outer rotor cup which includes a center hub and which houses a brushless direct current motor within an interior portion, wherein the center hub of the outer rotor cup is formed within an inner member and wherein at least one opening is formed between the inner member and an outer member of the outer rotor cup;
   providing an insert having a center hub, an interior portion and at least one curved fan blade which is integrated as a component part of the insert, wherein the fan blade is positioned within at least one opening formed between an inner member and an outer member of the insert;
   providing at least two segmented magnets;
   slip fitting the insert within the outer rotor cup;
   slip fitting the at least two segmented magnets between at least two vertical pegs on the insert;
   fitting the brushless direct current motor within the interior portion of the outer rotor cup and the insert; and
   press fitting a shaft through the center hub of the rotor cup and the insert and the brushless rotor assembly to the brushless direct current motor.

20. A rotor assembly for a brushless direct current motor comprising:
   an outer rotor cup having a circular configuration which includes a center hub and which houses a brushless direct current motor within an interior portion, wherein the center hub of the outer rotor cup is formed within an inner member and wherein the outer rotor cup includes four openings formed between two cross members which extend between the inner member and an outer member of the outer rotor cup, the inner member and outer member of the outer rotor cup having a circular configuration;
   a plastic insert having a center hub, a circular configuration and four curved fan blades which are integrated as a component part of the insert, wherein the fan blades are positioned within four openings formed between two cross members which extend between an inner member and an outer member of the insert, the inner member and outer member of the insert having a circular configuration, wherein the insert comprises four cross members in total, wherein each of the four openings within the insert houses at least one curved fan blade;
   four segmented magnets each of which is slip fit between two vertical pegs on the insert, wherein the insert includes four vertical pegs;
   a shaft which fits through the center hub of the rotor cup and the insert and which connects the brushless rotor assembly to a motor,
   wherein the insert is sized to fit within the rotor cup; wherein the four openings within the outer rotor cup form a profile which matches that of the four openings of the insert; wherein the insert is slip fitted within the outer rotor cup; wherein the outer rotor cup comprises an inner surface, wherein the four pegs on the insert each include a fillet; wherein each of the four segmented magnets which are slip fit between two vertical pegs on the plastic insert are adhered to the inner surface of the outer rotor cup with an adhesive; wherein the outer circular member of the plastic insert includes a bottom side which includes a trench between each of the four pegs and wherein each of the four magnets are slip fitted between the two pegs on a top surface of the trench; wherein the four cross members which extend between the inner circular member and the outer circular member of the outer rotor cup and the insert are cored out to form a cored out section between two sidewalls, wherein the sidewalls extend around the openings of the insert and wherein the cored out section and two sidewalls form a smooth transition between mating surfaces of the outer rotor cup and the insert; wherein the outer rotor cup and the insert comprise a common cross-sectional thickness; wherein the fan blades are positioned at angles relative to insert to allow for an opening to be present on either side of the blades to create a laminar flow of air over the blades and to force a downdraft of air over the motor to be cooled; wherein the fan blades are forward curved; wherein the fan blades protrude through the openings of the outer rotor cup and past the outer rotor cup's outer surface to provide an improved scooping action to force additional air through each opening within the insert; wherein the fan blades comprise an airfoil shape to improve efficiency of air flow by reducing drag of the rotating components at low and high speeds and to provide increased airflow to cool the motor; wherein the fan blades are positioned so that they fill in any gaps present between magnet spacing; and wherein the outer rotor cup, the plastic insert and the segmented magnets of the brushless direct current motor assembly are balanced through a machining process.

* * * * *